United States Patent [19]
Malek et al.

[11] Patent Number: 5,243,653
[45] Date of Patent: Sep. 7, 1993

[54] METHOD AND APPARATUS FOR MAINTAINING CONTINUOUS SYNCHRONOUS ENCRYPTION AND DECRYPTION IN A WIRELESS COMMUNICATION SYSTEM THROUGHOUT A HAND-OFF

[75] Inventors: Charles J. Malek, Crystal Lake, Ill.; Greg G. Gravunder, Kenosha, Wis.

[73] Assignee: Motorola, Inc., Schaumburg, Ill.

[21] Appl. No.: 888,685

[22] Filed: May 22, 1992

[51] Int. Cl.⁵ .............................................. H04L 9/02
[52] U.S. Cl. ...................................... 380/48; 380/49; 455/33.1; 379/59
[58] Field of Search ............... 379/59, 61, 63; 370/18, 370/19, 20, 21, 22; 455/33.1, 51, 57, 38.2; 380/34, 44, 45, 46, 47, 48, 49, 50

[56] References Cited

U.S. PATENT DOCUMENTS

| | | |
|---|---|---|
| 4,815,128 | 3/1989 | Malek . |
| 4,893,308 | 1/1990 | Wilson et al. . |
| 4,893,339 | 1/1990 | Bright et al. . |
| 5,060,266 | 10/1991 | Dent .......... 380/49 |
| 5,081,679 | 1/1992 | Dent .......... 380/48 |
| 5,148,485 | 9/1992 | Dent .......... 380/46 |

OTHER PUBLICATIONS

European Telecommunication Standard document prETS 300 175, parts 2,3,5, & 7 entitled "Digital European Cordless Telecommunications Common Interface" dated Aug. 1991 and produced by the European Telecommunications Standards Institute.

*Primary Examiner*—Tod R. Swann
*Attorney, Agent, or Firm*—Philip P. Macnak; William E. Koch; Thomas G. Berry

[57] ABSTRACT

In a wireless communication system comprising a plurality of fixed communication units (FCUs) (102) and portable communication units (PCUs) (120), each comprising an encryption synchronization counter (ESC) (314, 414), the PCU and FCU having a digital transmission format (201), a method of maintaining encryption and decryption throughout a hand-off is shown, comprising the steps of:

(a) loading (708) during a hand-off initiation a continuation value for a second FCU ESC; and
(b) incrementing (709) synchronously the second FCU ESC and the PCU ESC, starting from the continuation value and beginning at the time of hand-off completion.

19 Claims, 5 Drawing Sheets

701 — A PCU LINKED WITH A FIRST FCU DETERMINES A NEED FOR A HAND-OFF TO A SECOND FCU, SELECTS A TIME CONCURRENT WITH A FUTURE SYNC MARKER AS THE TIME FOR HAND-OFF COMPLETION, AND COMPUTES AS A CONTINUATION VALUE THE EXPECTED CONTENTS OF THE PCU ESC AT THE TIME SELECTED FOR HAND-OFF COMPLETION

702 — IN ESTABLISHING A SECOND WIRELESS LINK BETWEEN THE PCU AND THE SECOND FCU FOR RECEIVING THE HAND-OFF, THE PCU TRANSMITS, AND THE SECOND FCU RECEIVES, THE CONTINUATION VALUE AND THE TIME SELECTED FOR FOR HAND-OFF COMPLETION

706 — THE MICROPROCESSOR IN THE SECOND FCU STORES THE CONTINUATION VALUE FOR LATER LOADING INTO THE ESC CONTAINED THEREIN

708 — WHEN THE TIME SELECTED FOR HAND-OFF COMPLETION ARRIVES, THE MICROPROCESSOR IN THE FCU LOADS THE CONTINUATION VALUE INTO THE FCU ESC CONTAINED THEREIN AND ENABLES THE INCREMENTATION CLOCK FOR THE FCU ESC, THUS STARTING THE FCU ESC AT THE VALUE THAT THE PCU ESC HAS JUST REACHED

709 — FOR THE DURATION OF THE ESTABLISHED LINK THE INCREMENTATION CLOCKS IN THE PCU AND IN THE FCU ARE KEPT SYNCHRONIZED TO EACH OTHER BY THE RECURRENT SYNC MARKER

701 — A PCU LINKED WITH A FIRST FCU DETERMINES A NEED FOR A HAND-OFF TO A SECOND FCU, SELECTS A TIME CONCURRENT WITH A FUTURE SYNC MARKER AS THE TIME FOR HAND-OFF COMPLETION, AND COMPUTES AS A CONTINUATION VALUE THE EXPECTED CONTENTS OF THE PCU ESC AT THE TIME SELECTED FOR HAND-OFF COMPLETION

702 — IN ESTABLISHING A SECOND WIRELESS LINK BETWEEN THE PCU AND THE SECOND FCU FOR RECEIVING THE HAND-OFF, THE PCU TRANSMITS, AND THE SECOND FCU RECEIVES, THE CONTINUATION VALUE AND THE TIME SELECTED FOR FOR HAND-OFF COMPLETION

706 — THE MICROPROCESSOR IN THE SECOND FCU STORES THE CONTINUATION VALUE FOR LATER LOADING INTO THE ESC CONTAINED THEREIN

708 — WHEN THE TIME SELECTED FOR HAND-OFF COMPLETION ARRIVES, THE MICROPROCESSOR IN THE FCU LOADS THE CONTINUATION VALUE INTO THE FCU ESC CONTAINED THEREIN AND ENABLES THE INCREMENTATION CLOCK FOR THE FCU ESC, THUS STARTING THE FCU ESC AT THE VALUE THAT THE PCU ESC HAS JUST REACHED

709 — FOR THE DURATION OF THE ESTABLISHED LINK THE INCREMENTATION CLOCKS IN THE PCU AND IN THE FCU ARE KEPT SYNCHRONIZED TO EACH OTHER BY THE RECURRENT SYNC MARKER

METHOD AND APPARATUS FOR MAINTAINING CONTINUOUS SYNCHRONOUS ENCRYPTION AND DECRYPTION IN A WIRELESS COMMUNICATION SYSTEM THROUGHOUT A HAND-OFF

FIELD OF THE INVENTION

This invention relates in general to radio communication systems, and more specifically to two-way radio communication systems comprising a method and apparatus for performing synchronous encryption and decryption.

BACKGROUND OF THE INVENTION

Synchronous counter driven encryption techniques for full duplex digital wireless communication systems are well known in the art. Such systems normally employ separate encryption and decryption devices in each communication unit for encrypting and decrypting a transmit and receive path, respectively. The use of separate encryption and decryption devices in each communication unit adds to the cost and size of the communication unit, as well as complicating the synchronization of the two devices.

In order to maintain synchronization between two linked communication units, conventional systems must transmit an encryption synchronization signal (E-sync) along with the encrypted information. Transmitting the E-sync is not a problem when the information is stored data, which can be interrupted without concern. On the other hand, transmitting the E-sync in a voice communication system becomes somewhat more difficult, because the voice information is continuous and cannot be interrupted periodically for an E-sync transmission without noticeable gaps or noise bursts in the received voice audio signal.

Some conventional voice encryption systems "steal" bits periodically from the voice information and use the stolen bits for the transmission of the E-sync, the theory being that if the bits are stolen only infrequently, their absence will not seriously degrade the voice audio. Still, missed bits do degrade the voice audio quality somewhat, causing encryption systems based on the use of stolen voice bits not to rate as well in subjective tests of audio quality while in an encrypting mode as they rate in an unencrypted, i.e., "clear" mode.

Yet another problem with conventional encryption techniques used in wireless communication systems that can hand-off a portable communication unit (PCU) from one fixed communication unit (FCU) to another is associated with the hand-off procedure. The problem occurs because when two communication units are linked, the encryption device for the transmit path of each of the two communication units supplies the E-sync signal for the decryption device in the corresponding receive path of the other communication unit. Thus, after a hand-off to a new FCU, the encryption synchronization is lost for a period of time required to resynchronize the decryption device in the PCU with the new E-sync from the new FCU, and the decryption device in the new FCU with the E-sync from the PCU.

As the loss of encryption synchronization would cause the loss of all communicated information during the resynchronization period following the hand-off, conventional encryption systems for sending continuous information such as voice must revert to the clear mode prior to each hand-off, followed by a return to the encrypted mode after sufficient time has elapsed for encryption synchronization to be reestablished. This of course implies that each hand-off is accompanied by a brief period in which the security of the transmitted information is compromised.

Consequently, what is needed is an encryption technique that overcomes the aforementioned problems of conventional encryption techniques. That is to say, an encryption technique that can continue operating in the encrypted mode throughout a hand-off with no loss of information is needed. An encryption technique that does not degrade the voice quality is needed. Furthermore, an encryption technique that can be built with a lower cost and a smaller size than allowed by conventional encryption techniques is needed.

SUMMARY OF THE INVENTION

One aspect of the present invention is a method in a wireless communication system comprising a plurality of fixed communication units (FCUs), the FCU comprising an FCU encryption synchronization counter (ESC), and at least one portable communication unit (PCU), the PCU comprising a PCU ESC, the PCU and FCU for generating and receiving transmissions of information having a digital format and comprising a periodically recurring synchronization marker for synchronizing the transmissions, the method for maintaining a synchronized encryption and decryption of the information without interruption throughout a hand-off. The method comprises the step of loading, after establishment of a second wireless link between a PCU and a second PCU for receiving a hand-off of the PCU from a first wireless link with a first FCU to the second wireless link with the second FCU, a continuation value for the contents of a second FCU ESC in the second FCU, the continuation value comprising a value expected in the PCU ESC concurrent with hand-off completion. The loading step comprises the steps of selecting in the PCU a time of a specific future occurrence of the periodically recurring synchronization marker subsequent to the establishment of the second wireless link as the time selected for hand-off completion, and calculating in the PCU the continuation value from the contents of the PCU ESC at an occurrence of the periodically recurring synchronization marker prior to the time selected for hand-off completion in response to the selecting step, the continuation value being calculated in a manner that predicts the contents of the PCU ESC at the time selected for hand-off completion. The loading step further comprises the step of transmitting the completion value and the time selected for hand-off completion from the PCU to the second FCU in response to the calculating step. The method further comprises the step of incrementing synchronously the second FCU ESC and the PCU ESC, starting from the continuation value loaded in the loading step and beginning at the time selected for hand-off completion.

Another aspect of the present invention is a method in a wireless communication system comprising a plurality of fixed communication units (FCUs), the FCU comprising an FCU encryption synchronization counter (ESC), and at least one portable communication unit (PCU), the PCU comprising a PCU ESC, the PCU and FCU for generating and receiving transmissions of information having a digital format comprising time division multiplexing to provide at least one transmit channel and at least one receive channel, the at least one transmit channel and at least one receive channel being carried on a single radio frequency (RF) carrier, the digital format further comprising a periodically recurring synchronization marker for synchronizing the transmissions, the method for effecting a synchronized encryption and decryption of the information by generating a single encryption sequence for controlling the synchronized encryption and decryption in the communication units. The method comprises the step of loading, after establishment of a wireless link between a PCU and an FCU, identical start-up contents into the FCU ESC in the FCU and the PCU ESC in the PCU. The loading step comprises the steps of transmitting the start-up contents in a pre-determined encrypted format from the PCU to the FCU over the wireless link, the pre-determined encrypted format being for protecting the security of the start-up contents, and decrypting the start-up contents in the FCU according to a pre-determined decryption process for loading into the FCU ESC. The method further comprises incrementing synchronously the FCU ESC and the PCU ESC, starting from the start-up contents loaded in the loading step in order to generate identical, synchronized encryption sequences for encrypting and decrypting the information on the at least transmit channel and at least one receive channel present in the PCU and in the FCU, and performing in the FCU and in the PCU the synchronized encryption and decryption of the information in accordance with the encryption sequences generated in response to the incrementing step.

BRIEF DESCRIPTION OF THE DRAWINGS

FIG. 7 is a flow chart of a method of maintaining a synchronized encryption and decryption of information without interruption throughout a hand-off in accordance with the preferred embodiment of the present invention.

DESCRIPTION OF A PREFERRED EMBODIMENT

Figure 1:
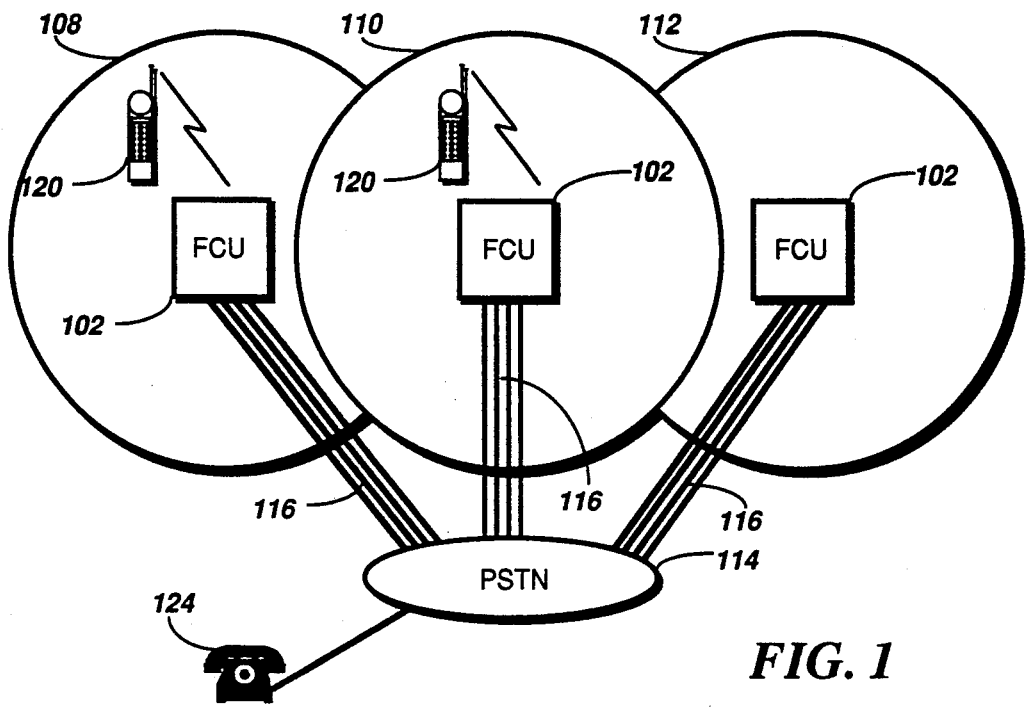
FIG. 1 is a block diagram of a wireless communication system in accordance with a preferred embodiment of the present invention.

With reference to FIG. 1, a preferred embodiment of a wireless communication system according to the present invention comprises a plurality of fixed communication units (FCUs) 102 that provide radio coverage in a plurality of radio coverage areas 108, 110, 112. The FCUs are coupled to the Public Switched Telephone Network (PSTN) 114 by a plurality of telephone lines 116. Those skilled in the art will recognize that the wireless communication system according to the present invention can also be used with telephone systems other than the PSTN, e.g., a private branch exchange (PBX). The system further comprises at least one portable communication unit (PCU) 120 having hand-off capability and transmitting and receiving in a time division multiple access and time division duplex (TDMA/TDD) digital format. The system further comprises at least one wired telephone set 124 for sending and receiving calls to and from a PCU 120. A PCU 120 may also communicate with another PCU 120 through one or more of the FCUs 102.

Further enabling the wireless communication system according to the present invention is the use of a standard protocol for communication between the plurality of FCUs and he at least one PCU. The standard protocol defines messages and procedures for requesting and establishing wireless communication links, for transmitting and receiving signaling data, for transmitting and receiving user communications, and for defining the TDMA/TDD format used therefor. An example of such a standard protocol is the Digital European Cordless Telecommunications (DECT) standard. The DECT standard is defined in the European Telecommunication Standard document prETS 300 175 entitled "Digital European Cordless Telecommunications Common Interface," dated August 1991, and produced by the European Telecommunications Standards Institute, applicable parts two, three, five and seven of which document are hereby incorporated by reference.

Figure 2:
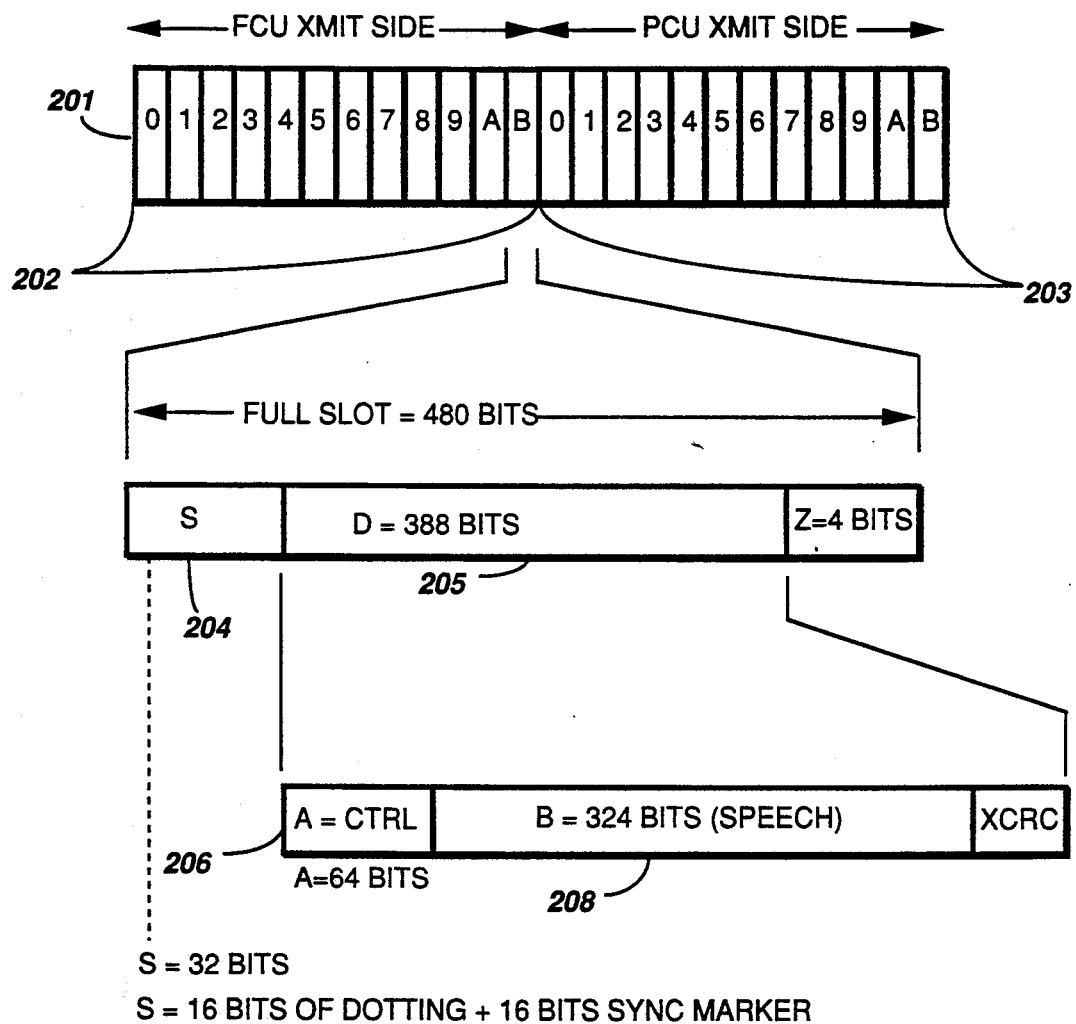
FIG. 2 is a diagram showing the contents of a time division multiple access and time division duplex (TDMA/TDD) frame constructed according to the Digital European Cordless Telecommunications (DECT) standard as used in accordance with the preferred embodiment of the present invention.

With reference to FIG. 2, a TDMA/TDD frame 201 constructed according to the DECT standard as used in accordance with the preferred embodiment of the present invention comprises twelve time slots 202 for FCU transmission and twelve time slots 203 for PCU transmission. The time slots 202, 203 are paired on a positional basis for transmitting and receiving information. For example, an FCU 102 (FIG. 1) transmitting in the time slot 202 labeled "0" would receive in the time slot 203 also labeled "0." Each time slot 202, 203 comprises a synchronization part 204 comprising a synchronization marker for synchronizing a linked PCU 120 (FIG. 1) and FCU 102, and a data part 205. The data part 205 comprises a control part 206 for passing control information, e.g., frame and slot identification and other control messages between the linked PCU 120 and FCU 102, and a user data part 208 for carrying user data, e.g., speech.

The synchronization part 204 and the control part 206 are used to synchronize the encryption and decryption of the information carried in the user data part 208 as well as any user signaling that is carried in the control part 06 in accordance with the present invention. By synchronizing the encryption and decryption processes through the use of the existing parts 204, 206 of the DECT time slot 202, 203, it is not necessary to steal bits from the user data part 208. Thus, the encryption and decryption technique according to the present invention does not degrade voice quality, as do conventional encryption and decryption techniques that employ bit stealing for synchronization. Also, by synchronizing the encryption and decryption circuitry by means of synchronization signals already available in the FCU 102 and the PCU 120 (FIG. 1), fewer parts are needed for synchronization, thereby reducing the cost and size of the PCU 120 and the FCU 102.

In operation, frame synchronization portions of TDMA/TDD circuits within in the FCU 102 and in the PCU 120 (described subsequently herein) enable the encryption and decryption of the information during the transmission of the user data part 208 and during the transmission of the control part 206 when the control part 206 comprises user signaling information. The TDMA/TDD circuits disable the encryption and decryption during all other parts of the transmission.

Figure 3:
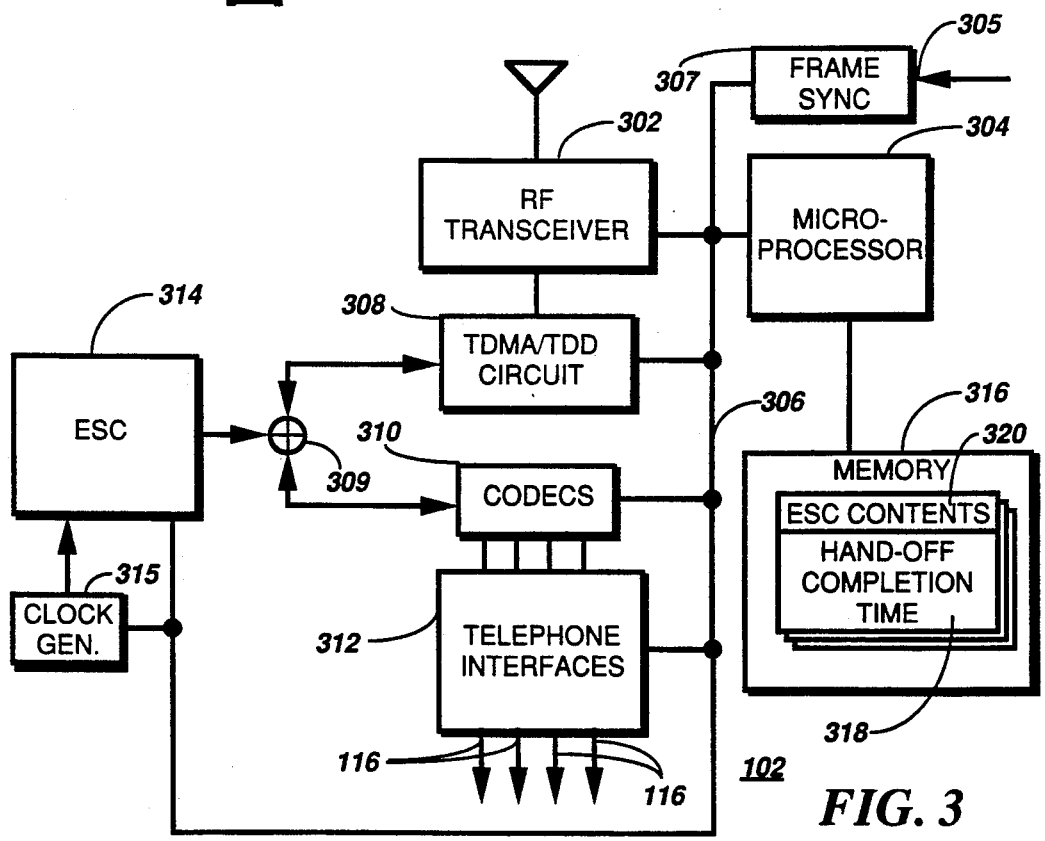
FIG. 3 is a block diagram of a fixed communication unit (FCU) in accordance with the preferred embodiment of the present invention.

With reference to FIG. 3, a preferred embodiment of the FCU 102 (FIG. 1) according to the present invention comprises a radio frequency (RF) transceiver 302 for transmitting and receiving radio signals comprising digital information transmitted and received in a TDMA/TDD format. The RF transceiver is coupled to a microprocessor 304 for controlling the transceiver 302 by a bus 306. The microprocessor 304 is coupled by the bus 306 to a system frame synchronization circuit 307 for maintaining frame synchronization among all the FCUs in the system. The frame synchronization circuit 307 receives a master system synchronization signal at a terminal 305. If the interface with the PSTN 114 (FIG. 1) is digital, the master synchronization signal can, for example, be derived from synchronization markers contained therein, after adjustments are made for differential delays between the PSTN 114 and the plurality of FCUs 102 (FIG. 1).

The RF transceiver 302 is also coupled to a TDMA/TDD circuit 308 for interfacing the RF transceiver 302 through a modulo-two summer 309 to a plurality of CODECs 310 for performing audio-to-digital and digital-to-audio conversions of signals transmitted and received, respectively, by the FCU 102. The plurality of CODECs 310 are coupled to a plurality of telephone interfaces 312 for coupling a plurality of telephone lines 116 to the CODECs 310. The modulo-two summer 309 is coupled to an encryption synchronization counter (ESC) 314 driven by an incrementation clock generator 315, operating at the serial bit rate of the TDMA/TDD circuit 308 and the CODECs 310 and synchronized by the TDMA/TDD circuit 308 to the master system synchronization signal, for providing encryption and decryption of the information passing between the CODECs 310 and the TDMA/TDD circuit 308 in accordance with the present invention.

The TDMA/TDD circuit 308, the CODECs 310, the incrementation clock generator 315, the ESC 314, and the telephone interfaces 312 also are all coupled to the bus 306 for providing control by the microprocessor 304. A memory 316 is also coupled to the microprocessor for storing program control software and for storing values in a plurality of memory locations 320 reserved for ESC contents and a corresponding plurality of memory locations 318 reserved for hand-off completion times, each of the two corresponding plurality of memory locations 320, 318 being associated with a corresponding plurality of paired receive and transmit TDMA/TDD time slots 202, 203 (FIG. 2) used by the FCU 102.

When one of the plurality of paired receive and transmit TDMA/TDD time slots 202, 203 (FIG. 2) is actively carrying user information, the value of the contents of the ESC at the end of each TDMA/TDD time slot 202, 203 is stored in the memory location 320 reserved for the ESC contents corresponding to the associated one of the plurality of paired receive and transmit TDMA/TDD time slots 202, 203, while the corresponding memory location 318 reserved for the hand-off completion time is not used. The value stored in the memory location 320 reserved for the ESC contents is then used to refresh the ESC 314 at the start of the next corresponding one of the plurality of paired receive and transmit TDMA/TDD time slots 202, 203. By using the memory 316 as just described in accordance with the present invention, a single ESC provides encryption and decryption of the information on all of the TDMA/TDD time slots 202, 203 used in the entire FCU, thus reducing the cost and size of the FCU.

When a transmit/receive time slot pair are not actively carrying user information, but are waiting for either a link start-up or a completion of a pending hand-off, the memory location 320 reserved for the ESC contents corresponding to the waiting time slot pair is used for storing a start-up or continuation value sent by a PCU effecting the link start-up or the pending hand-off, respectively. Whenever there is a pending hand-off directed to a TDMA/TDD time slot pair, the memory location 318 for the hand-off completion time corresponding to the TDMA/TDD time slot pair is used for controlling the timing of the pending hand-off in accordance with the present invention.

Figure 4:
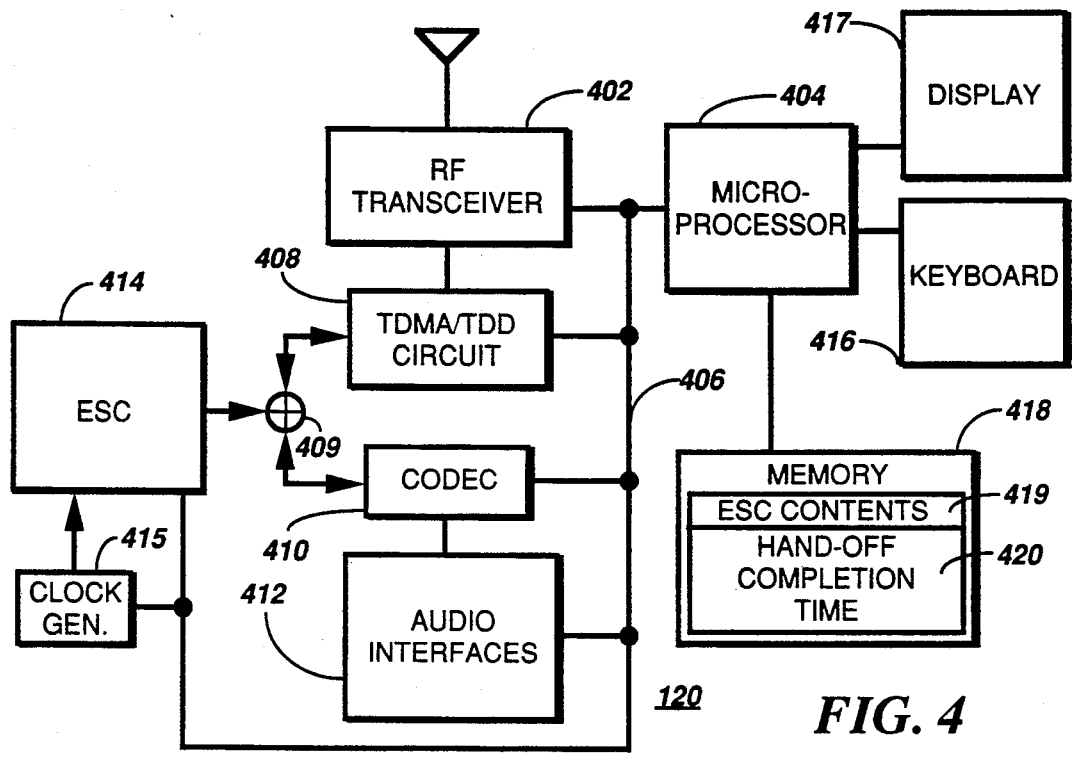
FIG. 4 is a block diagram of a portable communication unit (PCU) in accordance with the preferred embodiment of the present invention.

With reference to FIG. 4, the PCU 120 (FIG. 1) in accordance with the preferred embodiment of the present invention comprises an RF transceiver 402 for transmitting and receiving radio signals comprising digital information transmitted and received in a TDMA/TDD format. The RF transceiver is coupled to a microprocessor 404 for controlling the transceiver 402 by a bus 406. The RF transceiver 402 is also coupled to a TDMA/TDD circuit 408 for interfacing the RF transceiver 402 through a modulo-two summer 409 to a CODEC 410 for performing audio-to-digital and digital-to-audio conversions of signals transmitted and received, respectively, by the PCU 120. The modulo-two summer 409 is coupled to an ESC 414 driven by an incrementation clock generator 415, operating at the serial bit rate of the TDMA/TDD circuit 408 and the CODEC 410 for providing encryption and decryption of the information passing between the CODEC 410 and the TDMA/TDD circuit 408 in accordance with the present invention. By using the single ESC 414 for both encryption and decryption of the TDMA/TDD information, the size and cost of the PCU are reduced compared to conventional encryption and decryption techniques that use separate devices for transmit and receive paths.

The incrementation clock generator 415 is synchronized by the TDMA/TDD circuit 408 to a frame synchronization marker received over the wireless link from the FCU 102, the marker being synchronized within the FCU 102 by the master system synchronization signal at the terminal 305 (FIG. 3). The CODEC 410 is coupled to audio interfaces 412 for sending and receiving audio signals to and from a user of the PCU 120. The TDMA/TDD circuit 408, the CODEC 410, the incrementation clock generator 415, the ESC 414, and the audio interfaces 412 also are all coupled to the bus 406 for providing control by the microprocessor 404. A memory 418 is also coupled to the microprocessor 404 for storing program control software and for storing a pair of values 419, 420 of ESC contents and hand-off completion time, respectively. The values 419, 420 are determined by the microprocessor and then transmitted from the PCU to an FCU for link start-up and for link hand-off in accordance with the present invention. Also coupled to the microprocessor 404 are a display 417 for displaying information sent from the microprocessor 404 and a keyboard 416 for receiving control input from the user.

Figure 5:
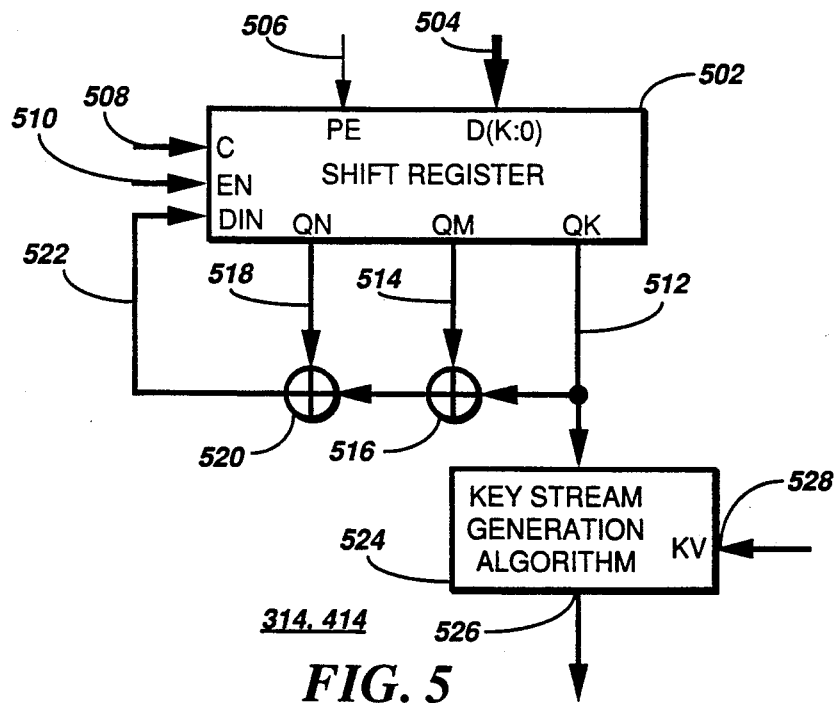
FIG. 5 is a block diagram of an encryption synchronization counter (ESC) in accordance with the preferred embodiment of the present invention.

With reference to FIG. 5, the preferred embodiment of the ESC 314, 414 according to the present invention comprises a shift register 502 having a parallel data input 504 enabled by a parallel enable 506 for loading a start-up or continuation value into the shift register 502 from the microprocessor 304, 404 (FIGs. 3, 4). The shift register 502 has a clock input 508 driven by the incrementation clock generator 315, 415 (FIGs. 3, 4) whenever the microprocessor 304, 404 enables a clock enable 510 for enabling and disabling the encryption and decryption of the information passing between the CODECs 310, 410 and the TDMA/TDD circuit 308, 408 (FIGs. 3, 4) in accordance with the present invention. The shift register is used as a linear feedback shift register by having its last output 512 and intermediate outputs 518, 514 fed back to its serial data input 522 through modulo-two summers 516, 520. Thus connected, the shift register generates at the last output 512 a pre-defined serial sequence of bits for synchronizing the encryption and decryption of information.

More preferably, for greater security the serial sequence of bits at the last output 512 is sent through a key stream generation algorithm device 524 primed by a key variable supplied from the microprocessor 304, 404 (FIGs. 3, 4) at a KV port 528 to produce a secure encryption sequence at a final output terminal 526. An example of such a device is the TRN4836A manufactured by Motorola, Inc. of Schaumburg, Ill. The serial signal at the final output terminal 526 is summed in the modulo-two summer 309, 409 (FIGS. 3, 4) for performing the encryption and decryption of the information transmitted and received by the FCU 102 and the PCU 120.

Even more preferably, in the FCU 102 a separate and unique key variable may be used for each pair of TDMA/TDD time slots 202, 203 (FIG. 2). The separate and unique key variable for each pair of TDMA/TDD time slots 202, 203 would be stored in the memory 316 (FIG. 3) and transferred to the KV port 528 by the microprocessor 304 (FIG. 3) at the beginning of each associated TDMA/TDD time slot 202, 203. The use of a separate and unique key variable as just described for each time slot pair provides a greater degree of encryption security while still allowing the use of a single ESC comprising a single key stream generation algorithm device 524 for all TDMA/TDD time slots 202, 203 in the FCU 102.

Figure 6:
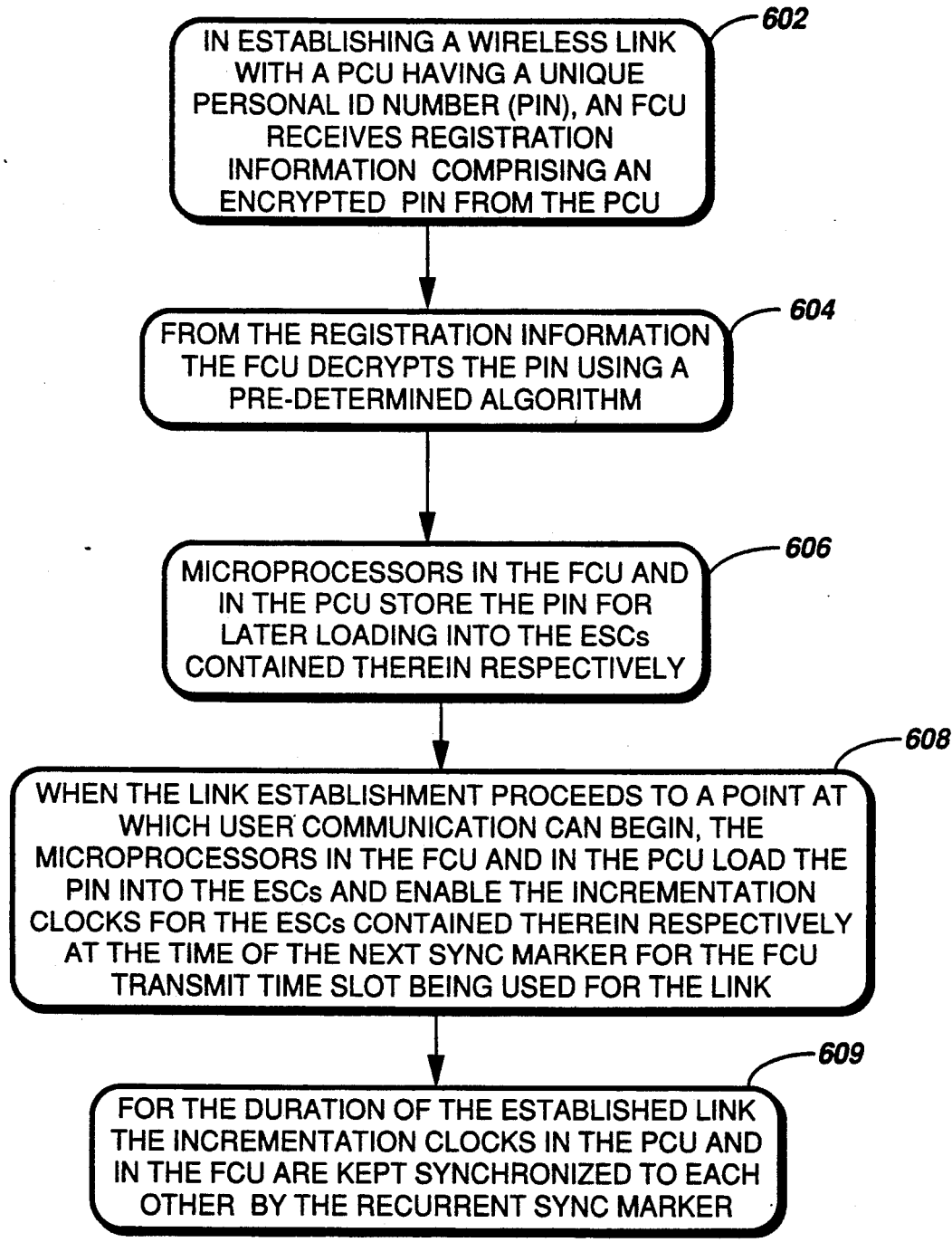
FIG. 6 is a flow chart of a method of effecting a synchronized encryption and decryption of information by generating a single encryption sequence in accordance with the preferred embodiment of the present invention.

With reference to FIG. 6, a method of effecting a synchronized encryption and decryption of information by generating a single encryption sequence in accordance with the preferred embodiment of the present invention comprises receiving 602 in an FCU 102 (FIG. 1) registration information from a PCU 120 (FIG. 1) during a link establishment between the PCU 120 and FCU 102. The registration information comprises an encrypted personal identification number (CPIN). In response to receiving the registration information the FCU 102 decrypts 604 a corresponding personal identification number (PIN) using a pre-determined algorithm and stores the PIN in the memory location 320 reserved for the ESC contents (FIG. 3) corresponding to the time slot used by the FCU 102 for the link. Because the PIN is also stored in the PCU 120, the microprocessors 304, 404 (FIGS. 3, 4) in both the FCU 102 and the PCU 120 will load 606 identical PIN values into their respective ESCs 314, 414 (FIGS. 3, 4) at the proper time as described herein below.

When the link establishment proceeds to a point at which the link is ready for user communication, the microprocessors 304, 404 load 608 the PIN into the ESCs 314, 414 in the FCU 102 and the PCU 120 (FIG. 1), respectively, and simultaneously enable the respective clock enable 510 (FIG. 5) for the ESCs 314, 414 at the time of the next sync marker in the synchronization part 204 (FIG. 2) of the signal transmitted by the FCU 102 in the FCU transmit time slot 202 (FIG. 2) being used. Those skilled in the art will recognize that the synchronization part 204 of the signal transmitted by the PCU 120 in the PCU transmit time slot 203 (FIG. 2) could alternatively be used to enable the respective incrementation clock generators 315, 415, so long as the same signal is used in both the FCU 102 and the PCU 120 to enable the clock enable 510 of the ESCs 314, 414 at the same time.

For the duration of the established link the incrementation clock generators 315, 415 for the ESCs 314, 414 are synchronized 609 with one another by the TDMA/TDD circuits 308, 408 (FIGS. 3, 4), respectively, in response to the recurrent sync marker in the synchronization part 204 (FIG. 2) of the signal transmitted by the FCU 102 (FIG. 1).

As is well known by those skilled in the art, if a first serial bit stream is summed in a first modulo-two summer (XOR logic gate) with a second pseudo-random serial bit stream synchronized with and having the same bit rate as the first serial bit stream, then a new (encrypted) serial bit stream is produced at the output of the modulo-two summer. If the resultant new (encrypted) serial bit stream is then summed in a second modulo-two summer with a third pseudo-random serial bit stream synchronized with and identical to the second pseudo-random serial bit stream, then a serial bit stream identical to the first serial bit stream is produced at the output of the second modulo-two summer. Thus, the present invention provides a method and apparatus for effecting a synchronized encryption and decryption of information by generating a single encryption sequence for controlling the synchronized encryption and decryption occurring in the FCU 102 and the PCU 120.

With reference to FIG. 7, a method of maintaining a synchronized encryption and decryption of information without interruption throughout a hand-off in accordance with the preferred embodiment of the present invention comprises a PCU 120 (FIG. 1) linked to a first FCU 120 (FIG. 1) determining 701 a need for a hand-off to a second FCU 120 and then selecting a time for hand-off completion, the selected time being concurrent with a future sync marker in the synchronization part 204 (FIG. 2) of the signal transmitted by the first FCU 102 in the FCU transmit time slot 202 (FIG. 2) used for the link with the first FCU 102. This is followed in the same step 701 with the computation by the PCU 120 of a continuation value for the hand-off, i.e., a value expected in the ESC 414 (FIG. 4) of the PCU 120 at the time selected for hand-off completion.

Next, the PCU 120 establishes 702 a second wireless link with the second FCU 102 and transmits the continuation value and the time selected for hand-off completion. Because the time for hand-off completion is concurrent with a future sync marker in the synchronization part 204 (FIG. 2) of the signal transmitted by the first FCU 102 in the FCU transmit time slot 202, and because all FCUs 102 in the system are synchronized by the master system synchronization signal at the terminal 305 (FIG. 3) in the FCU 102, the second FCU 102 can determine the timing of the hand-off with great accuracy.

The second FCU 102 (FIG. 1) stores 706 the continuation value and the time for hand-off completion in the memory location 320 for ESC contents (FIG. 3) and the memory location 318 for hand-off completion time (FIG. 3), respectively, the memory locations 320, 318 being the ones associated with the corresponding TDMA/TDD time slot used by the FCU 102 for the second wireless link.

When the time selected for hand-off completion arrives, the microprocessor 304 (FIG. 3) accesses its memory 316 to retrieve the continuation value, loads 708 the continuation value into the ESC 314 (FIG. 3), and enables the incrementation clock for the ESC 314, thus starting the ESC 314 of the second FCU 102 at the value that the ESC 414 (FIG. 4) of the PCU 120 has simultaneously reached.

For the duration of the second wireless link, the incrementation clock generators 315, 415 for the ESCs 314, 414 in the second FCU 102 and the PCU 120, respectively, are synchronized 709 with one another by the TDMA/TDD circuits 308, 408 (FIGS. 3, 4), respectively, in response to the recurrent sync marker in the synchronization part 204 (FIG. 2) of the signal transmitted by the second FCU 102 (FIG. 1).

Thus, the present invention comprises a method and apparatus for effecting a synchronized encryption and decryption of information by generating a single encryption sequence for controlling the synchronized encryption and decryption occurring in the FCU 102 and the PCU 120. Furthermore, the present invention comprises a method and apparatus for maintaining the synchronized encryption and decryption of the information without interruption throughout a hand-off. Consequently, the present invention provides an encryption technique that overcomes the aforementioned problems of conventional encryption techniques by providing: (a) an encryption technique that can continue operating in the encrypted mode throughout a hand-off with no loss of information, (b) an encryption technique that does not steal bits and thus degrade the voice quality, and (c) an encryption technique that can be built with a lower cost and a smaller size than a conventional encryption system.

We claim:

1. In a wireless communication system comprising a plurality of fixed communication units (FCUs), the FCU comprising an FCU encryption synchronization counter (ESC), and at least one portable communication unit (PCU), the PCU comprising a PCU ESC, the PCU and FCU for generating and receiving transmissions of information having a digital format and comprising a periodically recurring synchronization marker for synchronizing the transmissions, a method of maintaining a synchronized encryption and decryption of the information without interruption throughout a hand-off, the method comprising the steps of:

loading, after establishment of a second wireless link between a PCU and a second FCU for receiving a hand-off of the PCU from a first wireless link with a first FCU to the second wireless link with the second FCU, a continuation value for the contents of a second FCU ESC in the second FCU, the continuation value comprising a value expected in the PCU ESC concurrent with hand-off completion, wherein the loading step comprises the steps of:

selecting in the PCU a time of a specific future occurrence of the periodically recurring synchronization marker subsequent to the establishment of the second wireless link as the time selected for hand-off completion;

calculating in the PCU the continuation value from the contents of the PCU ESC at an occurrence of the periodically recurring synchronization marker prior to the time selected for hand-off completion in response to the selecting step, the continuation value being calculated in a manner that predicts the contents of the PCU ESC at the time selected for hand-off completion; and transmitting the completion value and the time selected for hand-off completion from the PCU to the second FCU in response to the calculating step; and incrementing synchronously the second FCU ESC and the PCU ESC, starting from the continuation value loaded in the loading step and beginning at the time selected for hand-off completion.

2. The method according to claim 1, further comprising the steps of:

writing, after establishment of the first wireless link between the PCU and the first FCU, identical start-up contents into a first FCU ESC in the first FCU and the PCU ESC in the PCU, the first FCU ESC and the PCU ESC for synchronizing common encryption processes of the first FCU and the PCU; and advancing synchronously the first FCU ESC and the PCU ESC, starting from the start-up contents loaded in the writing step.

3. The method according to claim 2, wherein the writing step comprises the steps of:

transmitting the start-up contents in a pre-determined encrypted format from the PCU to the first FCU over the wireless link, the pre-determined encrypted format being for protecting the security of the start-up contents; and decrypting the start-up contents in the first FCU according to a pre-determined decryption process for loading into the first FCU ESC.

4. The method according to claim 2, wherein the advancing step comprises the steps of:

beginning in the FCU and in the PCU incrementing the first FCU ESC and the PCU ESC simultaneously in response to an occurrence of the periodically recurring synchronization marker subsequent to the completion of the writing step; and generating in the FCU and in the PCU clock signals for incrementing the first FCU ESC and the PCU ESC, the clock signals being synchronized by the periodically recurring synchronization marker.

5. The method according to claim 2, wherein the writing step comprises the steps of:

transmitting the start-up contents in a pre-determined encrypted format from the PCU to the first FCU over the wireless link, the pre-determined encrypted format being for protecting the security of the start-up contents; and decrypting the start-up contents in the first FCU according to a pre-determined decryption process for loading into the first FCU ESC, and wherein the advancing step comprises the steps of:

beginning in the FCU and in the PCU incrementing the first FCU ESC and the PCU ESC simultaneously in response to an occurrence of the periodically recurring synchronization marker subsequent to the completion of the writing step; and generating in the FCU and in the PCU clock signals for incrementing the first FCU ESC and the PCU ESC, the clock signals being synchronized by the periodically recurring synchronization marker.

6. The method according to claim 2, wherein the writing step comprises the steps of:

transmitting the start-up contents in a pre-determined encrypted format from the PCU to the first FCU over the wireless link, the pre-determined encrypted format being for protecting the security of the start-up contents; and decrypting the start-up contents in the first FCU according to a pre-determined decryption process for loading into the first FCU ESC, and wherein the incrementing step comprises the steps of:

beginning in the FCU incrementing the second FCU ESC at the time selected for hand-off completion; and generating in the FCU a clock signal for incrementing the second FCU ESC, the clock signal being synchronized by the periodically recurring synchronization marker.

7. The method according to claim 2, wherein the advancing step comprises the steps of:

beginning in the FCU and in the PCU incrementing the first FCU ESC and the PCU ESC simultaneously in response to an occurrence of the periodically recurring synchronization marker subsequent to the completion of the writing step; and generating in the FCU and in the PCU clock signals for incrementing the first FCU ESC and the PCU ESC, the clock signals being synchronized by the periodically recurring synchronization marker, and wherein the incrementing step comprises the steps of:

beginning in the FCU incrementing the second FCU ESC at the time selected for hand-off completion; and generating in the FCU a clock signal for incrementing the second FCU ESC, the clock signal being synchronized by the periodically recurring synchronization marker.

8. The method according to claim 2, wherein the writing step comprises the steps of:

transmitting the start-up contents in a pre-determined encrypted format from the PCU to the first FCU over the wireless link, the pre-determined encrypted format being for protecting the security of the start-up contents; and decrypting the start-up contents in the first FCU according to a pre-determined decryption process for loading into the first FCU ESC, and wherein the advancing step comprises the steps of:

beginning in the FCU and in the PCU incrementing the first FCU ESC and the PCU ESC simultaneously in response to an occurrence of the periodically recurring synchronization marker subsequent to the completion of the writing step; and generating in the FCU and in the PCU clock signals for incrementing the first FCU ESC and the PCU ESC, the clock signals being synchronized by the periodically recurring synchronization marker, and wherein the incrementing step comprises the steps of:

beginning in the FCU incrementing the second FCU ESC at the time selected for hand-off completion; and generating in the FCU a clock signal for incrementing the second FCU ESC, the clock signal being synchronized by the periodically recurring synchronization marker.

9. The method according to claim 1, wherein the incrementing step comprises the steps of:

beginning in the FCU incrementing the second FCU ESC at the time selected for hand-off completion; and generating in the FCU a clock signal for incrementing the second FCU ESC, the clock signal being synchronized by the periodically recurring synchronization marker.

10. In a wireless communication system comprising a plurality of fixed communication units (FCUs), the FCU comprising an FCU encryption synchronization counter (ESC), and at least one portable communication unit (PCU), the PCU comprising a PCU ESC, the PCU and FCU for generating and receiving transmissions of information having a digital format comprising time division multiplexing to provide at least one transmit channel and at least one receive channel, the at least one transmit channel and at least one receive channel being carried on a single radio frequency (RF) carrier, the digital format further comprising a periodically recurring synchronization marker for synchronizing the transmissions, a method of effecting a synchronized encryption and decryption of the information by generating a single encryption sequence for controlling the synchronized encryption and decryption in the communication units, the method comprising the steps of:

loading, after establishment of a wireless link between a PCU and an FCU, identical start-up contents into the FCU ESC in the FCU and the PCU ESC in the PCU, wherein the loading step comprises the steps of:

transmitting the start-up contents in a predetermined encrypted format from the PCU to the FCU over the wireless link, the pre-determined encrypted format being for protecting the security of the start-up contents; and decrypting the start-up contents in the FCU according to a pre-determined decryption process for loading into the FCU ESC;

incrementing synchronously the FCU ESC and the PCU ESC, starting from the start-up contents loaded in the loading step in order to generate identical, synchronized encryption sequences for encrypting and decrypting the information on the at least one transmit channel and at least one receive channel present in the PCU and in the FCU; and performing in the FCU and in the PCU the synchronized encryption and decryption of the information in accordance with the encryption sequences generated in response to the incrementing step.

11. The method according to claim 10, wherein the incrementing step comprises the steps of:

beginning in the FCU and in the PCU incrementing the FCU ESC and the PCU ESC simultaneously in response to an occurrence of the periodically recurring synchronization marker subsequent to the completion of the loading step; and generating in the FCU and in the PCU clock signals for incrementing the FCU ESC and the PCU ESC, the clock signals being synchronized by the periodically recurring synchronization marker.

12. A portable communication unit (PCU) for maintaining a synchronized encryption and decryption of information without interruption throughout a hand-off in a wireless communication system comprising a plurality of fixed communication units (FCUs), each FCU comprising an FCU encryption synchronization counter (ESC), and at least one PCU comprising a PCU ESC, the PCU and FCU comprising means for generating and receiving transmissions of information having a digital format comprising time division multiplexing comprising at least one transmit channel and at least one receive channel, the at least one transmit channel and at least one receive channel being carried on a single radio frequency (RF) carrier, the digital format further comprising a periodically recurring synchronization marker for synchronizing the transmissions, the PCU further comprising:

first processor means for calculating and transferring a continuation value and a time of hand-off completion to an FCU, the continuation value comprising a value expected in the PCU ESC at the time of hand-off completion;

incrementation means coupled to the PCU ESC for incrementing the PCU ESC; and synchronization means coupled to the incrementation means for synchronizing the incrementation of the PCU ESC in response to reception of a master synchronization signal from the FCU.

13. The PCU of claim 12, further comprising priming means coupled to the PCU ESC for loading a pre-determined start-up value into the PCU ESC.

14. The PCU of claim 13, further comprising:

start-up encryption means coupled to the priming means for encrypting the start-up value by a pre-determined encryption process; and second processor means coupled to the start-up encryption means for transferring the encrypted start-up value to the FCU.

15. A fixed communication unit (FCU) for maintaining a synchronized encryption and decryption of information without interruption throughout a hand-off in a wireless communication system comprising a plurality of FCUs and at least one portable communication unit (PCU), each FCU comprising an FCU encryption synchronization counter (ESC) and each of the at least one PCU comprising a PCU ESC, the PCU and FCU comprising means for generating and receiving transmissions of information having a digital format comprising time division multiplexing comprising at least one transmit channel and at least one receive channel, the at least one transmit channel and at least one receive channel being carried on a single radio frequency (RF) carrier, the digital format further comprising a periodically recurring synchronization marker for synchronizing the transmissions, the FCU further comprising:

memory means for storing a continuation value and a time of hand-off completion sent from a PCU;

first processor means coupled to the memory means for loading the continuation value into the FCU ESC at the time for hand-off completion;

incrementation means coupled to the first processor means and to the FCU ESC for incrementing the FCU ESC from the time of hand-off completion; and synchronization means for synchronizing the incrementation of the FCU ESC in response to reception of a master synchronization signal.

16. The FCU of claim 15, further comprising priming means coupled to the FCU ESC for loading a start-up value sent from the PCU into the FCU ESC.

17. The FCU of claim 16, wherein the priming means comprises:

decryption means coupled to the priming means for decrypting the start-up value by means of a pre-determined decryption process; and second processor means coupled to the decryption means for transferring the decrypted start-up value to the FCU ESC.

18. A portable communication unit (PCU) for maintaining a synchronized encryption and decryption of information without interruption throughout a hand-off in a wireless communication system comprising a plurality of fixed communication units (FCUs), each FCU comprising an FCU encryption synchronization counter (ESC), and at least one PCU comprising a PCU ESC, the PCU and FCU comprising transceivers for generating and receiving transmissions of information having a digital format comprising time division multiplexing comprising at least one transmit channel and at least one receive channel, the at least one transmit channel and at least one receive channel being carried on a single radio frequency (RF) carrier, the digital format further comprising a periodically recurring synchronization marker for synchronizing the transmissions, the PCU further comprising:

a first processor element for calculating and transferring a continuation value and a time of hand-off completion to an FCU, the continuation value comprising a value expected in the PCU ESC at the time of hand-off completion;

an incrementation clock coupled to the PCU ESC for incrementing the PCU ESC;

a synchronization processor element coupled to the incrementation clock for synchronizing the incrementation of the PCU ESC in response to reception of a master synchronization signal from the FCU;

a second processor element coupled to the PCU ESC for loading a pre-determined start-up value into the PCU ESC;

an encryption circuit coupled to the second processor element for encrypting the start-up value by a pre-determined encryption process; and a third processor element coupled to the encryption circuit for transferring the encrypted start-up value to the FCU.

19. A fixed communication unit (FCU) for maintaining a synchronized encryption and decryption of information without interruption throughout a hand-off in a wireless communication system comprising a plurality of FCUs, each FCU comprising an FCU encryption synchronization counter (ESC), and at least one portable communication unit (PCU) comprising a PCU ESC, the PCU and FCU comprising transceivers for generating and receiving transmissions of information having a digital format comprising time division multiplexing comprising at least one transmit channel and at least one receive channel, the at least one transmit channel and at least one receive channel being carried on a single radio frequency (RF) carrier, the digital format further comprising a periodically recurring synchronization marker for synchronizing the transmissions, the FCU further comprising:
- a memory for storing a continuation value and a time of hand-off completion sent from a PCU;
- a first processor element coupled to the memory for loading the continuation value into the FCU ESC at the time for hand-off completion;
- an incrementation clock coupled to the first processor element and to the FCU ESC for incrementing the FCU ESC from the time of hand-off completion;
- a synchronization circuit coupled to the incrementation clock for synchronizing the incrementation of the FCU ESC in response to reception of a master synchronization signal; and
- a second processor element coupled to the FCU ESC for loading a start-up value sent from the PCU into the FCU ESC, wherein the second processor element comprises:
  - a decryption element for decrypting the start-up value by a pre-determined decryption process; and
  - a transfer element coupled to the decryption element for transferring the decrypted start-up value to the FCU ESC.

* * * * *